US006967835B2

(12) United States Patent
Chiang

(10) Patent No.: US 6,967,835 B2
(45) Date of Patent: Nov. 22, 2005

(54) WIRELESS KEYBOARD WITH IMPROVED RADIATION TRANSMISSION

(75) Inventor: Chih-Hsiang Chiang, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 30 days.

(21) Appl. No.: 10/409,904

(22) Filed: Apr. 8, 2003

(65) Prior Publication Data

US 2004/0201953 A1    Oct. 14, 2004

(51) Int. Cl.$^7$ ............................................. G06F 1/16
(52) U.S. Cl. ..................... 361/686; 361/683; 398/129; 398/131
(58) Field of Search ................................ 361/679, 680, 361/683, 684, 686; 342/53; 235/462.45, 235/462.46; 455/556.1, 556.2; 385/31, 32, 385/53, 66, 73, 74; 248/299.1; 398/118–142; 439/445, 446, 578–603

(56) References Cited

U.S. PATENT DOCUMENTS

| | | | | |
|---|---|---|---|---|
| 5,762,306 A | * | 6/1998 | Day ......................... | 248/274.1 |
| 5,781,405 A | | 7/1998 | Vossler ...................... | 361/686 |
| 5,978,213 A | | 11/1999 | Vossler ...................... | 361/686 |
| 5,978,214 A | | 11/1999 | Vossler ...................... | 361/686 |
| 6,081,356 A | * | 6/2000 | Branc et al. ............... | 398/129 |
| 6,104,606 A | | 8/2000 | Vossler ...................... | 361/686 |
| 6,128,117 A | * | 10/2000 | Kim ........................... | 398/115 |
| 6,501,581 B1 | * | 12/2002 | Snyder et al. ............. | 398/129 |
| 6,504,709 B2 | * | 1/2003 | Yang et al. ................ | 361/686 |
| 6,594,142 B2 | * | 7/2003 | Katz .......................... | 361/680 |
| 6,606,431 B2 | * | 8/2003 | Unsworth ................... | 385/31 |
| 6,714,404 B1 | * | 3/2004 | Wu ............................ | 361/680 |
| 2004/0075588 A1 | * | 4/2004 | Wang et al. ................ | 341/22 |

* cited by examiner

*Primary Examiner*—Lynn Feild
*Assistant Examiner*—Anthony Q. Edwards
(74) *Attorney, Agent, or Firm*—Ladas & Parry LLP

(57) ABSTRACT

The invention relates to a wireless keyboard capable of operating with a radiation-based signal receiver of a computing apparatus. The wireless keyboard includes a radiation-based signal transmitter functions converting a corresponding key signal into a radiation beam and emitting the radiation beam. The wireless keyboard also includes a user-adjustable guiding device having a first end and a second end. The first end abuts on the radiation-based signal transmitter such that the radiation beam emitted by the radiation-based signal transmitter enters into the guiding device from the first end. The guiding device also leads the radiation beam out from the second end. The radiation beam, led out from the second end of the guiding device, has a covered zone. When the keyboard operates with the radiation-based signal receiver, the second end of the guiding device approaches the radiation-based signal receiver by adjusting the guiding device such that the radiation-based signal receiver is located in the covered zone of the radiation beam.

Figure 1A:
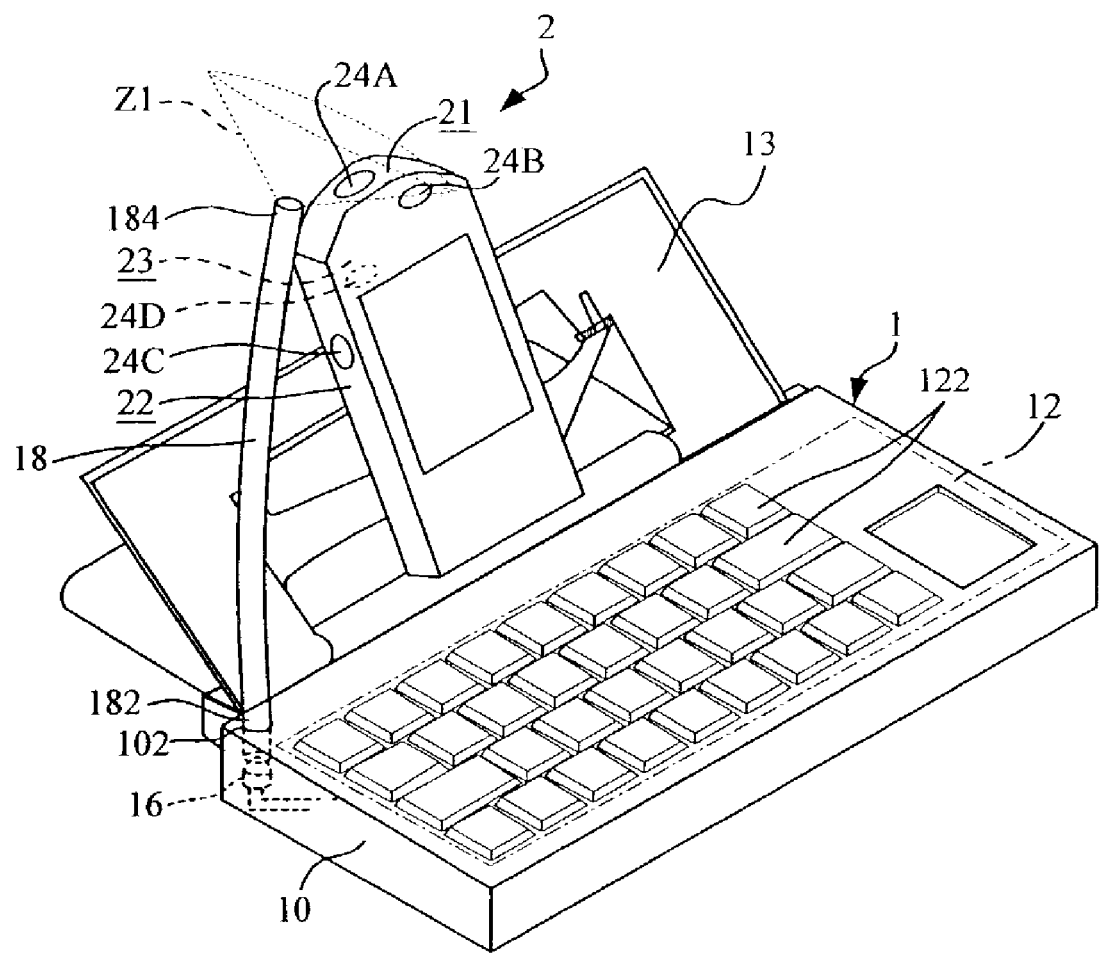

2 Claims, 7 Drawing Sheets ns between an* infrared transmitter of an infrared wireless keyboard and the

WIRELESS KEYBOARD WITH IMPROVED RADIATION TRANSMISSION

FIELD OF THE INVENTION

This present invention relates to a wireless keyboard capable of operating with a radiation-based signal receiver of a computing apparatus, and more particularly to a wireless keyboard with improved radiation transmission to the radiation-based signal receiver of the computing apparatus.

BACKGROUND OF THE INVENTION

On consideration of convenience, wireless keyboard are popularly used with various computing apparatuses, e.g., desk-top computers, notebook computers, personal digital assistants, mobile phones, pocket computers and the like. Specifically, infrared wireless keyboards for use with various computing apparatuses are known. An infrared wireless keyboard simply uses an infrared transmitter in the keyboard and an infrared receiver in a computing apparatuses to establish a link between the keyboard and the computing apparatus. The infrared wireless keyboard does not, of course, need a physical wire connection between the keyboard and the personal computer so that there is no wire clutter.

The infrared wireless keyboard, however, has numerous drawbacks. Specifically, the infrared wireless keyboard requires no obstacle in a path between the infrared transmitter in the keyboard and the infrared receiver in the computing apparatus. Whenever a computing apparatuses has an infrared receiver set on "odd" situation thereof, possibility of establishing transmission path between an infrared transmitter of an infrared wireless keyboard and the infrared receiver of the computing apparatus becomes a criterion to determine whether the wireless keyboard is available or not.

Pocketop Computer Corp. has developed an attachment for an infrared wireless keyboard used with a portable computing apparatus with an infrared receivers set on or near top side thereof. The attachment includes a support and a reflective board engaged to the support. The portable computing apparatus can be positioned substantially erected by leaning itself against the support. In such case, the reflective board can reflect infrared beam emitted from the infrared transmitter to the infrared receiver. However, it is obvious that the solution, provided by Pocketop Computer Corp., is only applied to portable computing apparatuses with infrared receivers set on or near top sides thereof. That is the wireless keyboard of the prior art is not applicable for a portable computing apparatus which has an infrared receiver set on "odd" situations thereof, e.g., waist sides or rear sides.

Gateway 2000, Inc. has utilized various improved configurations for adjusting emitting or receiving direction of an infrared emitted from or to an infrared transceiver set on an electronic apparatus. Details regarding the aforesaid improved configurations have been disclosed in the U.S. Pat. Nos. 6,104,606, 5,978,214, 5,978,213, and 5,781,405. However, it is obvious that the solutions, provided by Gateway 2000, Inc., can not be applied to various computing apparatuses equipped with infrared receivers. Even if an infrared transmitter of a wireless keyboard according to the aforesaid prior arts is capable of adjusting emitting direction of an infrared emitted therefrom, the wireless keyboard is not applicable for a computing apparatus which has an infrared receiver set on "odd" sides thereof.

Therefore, no obstacle in the path and a shorter distance between the transmitter and the receiver constrain the flexibility that user would use a wireless keyboard because an artificial limit is placed on the location and the distance do exist between the infrared wireless keyboard and the computing apparatus. Moreover, the distance between the infrared wireless keyboard and the computing apparatus must not be too great so that the infrared receiver in the computing apparatus cannot detect the infrared beam from the infrared transmitter of the infrared wireless keyboard.

In addition, the infrared wireless keyboard has large power consumption requirements because of the infrared transmitter. The infrared wireless keyboard typically operates on a six-volt power source that is commonly derived from four 1.5-volt batteries. Moreover, the increased power consumption reduces overall battery life so that the batteries must be replaced more often.

SUMMARY OF THE INVENTION

Accordingly, an objective of the invention is to provide a universal wireless keyboard used with a computing apparatus with a radiation-based signal receiver, such as an infrared receivers, set on any situation, even an "odd" situation.

Another objective of the invention is to provide a wireless keyboard, with a radiation-based signal transmitter such as an infrared transmitter, capable of operating with a radiation-based signal receiver, such as an infrared receiver, of a computing apparatus. Moreover, in particular, no obstacle exists between the radiation-based signal transmitter of the wireless keyboard and the radiation-based signal receiver of the computing apparatus.

Another objective of the invention is to provide a wireless keyboard with a radiation-based transmitter which can be embodied by using a device of less power consumption.

A wireless keyboard, according to a first preferred embodiment of the invention, is capable of operating with a radiation-based signal receiver of a computing apparatus. The wireless keyboard includes a housing, a user input device mounted in the housing, a processor, a radiation-based signal transmitter, and a user-adjustable guiding device. The user input device includes a plurality of user-operable keys. The processor functions generating a corresponding key signal responsive to key-in of one of the keys. The radiation-based signal transmitter functions converting the corresponding key signal into a radiation beam, and emitting the radiation beam then. The user-adjustable guiding device has a first end and a second end. The first end abuts on the radiation-based signal transmitter such that the radiation beam emitted by the radiation-based signal transmitter enters into the guiding device from the first end. The guiding device also leads the radiation beam out from the second end. The radiation beam led out from the second end of the guiding device has a covered zone. When the keyboard operates with the radiation-based signal receiver, the second end of the guiding device approaches the radiation-based signal receiver by adjusting the guiding device such that the radiation-based signal receiver is located in the covered zone of the radiation beam.

A wireless keyboard, according to a second preferred embodiment of the invention, is capable of communicating with a computing apparatus having at least two radiation-based receivers. The wireless keyboard includes a housing, a user input device mounted in the housing, a processor, a radiation-based signal transmitter, and a user-adjustable guiding device. The user input device is mounted in the base, and includes a plurality of user-operable keys. The processor functions generating a corresponding key signal responsive to key-in of one of the keys. The radiation-based signal transmitter functions converting the corresponding key signal into a radiation beam, and emitting the radiation beam then. The user-adjustable guiding device has a first end and a second end. The first end abuts on the radiation-based signal transmitter such that the radiation beam emitted by the radiation-based signal transmitter enters into the guiding device from the first end. The guiding device also leads the radiation beam out from the second end. The radiation beam led out from the second end of the guiding device has a first covered zone. When the keyboard communicates with the computing apparatus, the second end of the guiding device approaches one of the at least two radiation-based signal receivers by adjusting the guiding device such that said one of the at least two radiation-based signal receivers is located in the first covered zone of the radiation beam led out from the second end of the guiding device.

The guiding device of the wireless keyboard, according to the second preferred embodiment of the invention, consists of a flexible tube and a bundle of optical fibers wrapped by the flexible tube. The flexible tube thereon provides with at least one breach which the radiation beam is leaked out from. The radiation beam leaked out from each of the at least one breach has a respective second covered zone. When the keyboard communicates with the computing apparatus, one of the at least one breach approaches another of the at least two radiation-based signal receivers by adjusting the guiding device such that said another of the at least two radiation-based signal receivers is located in the second covered zone of the radiation beam leaked out from said one of the at least one breach.

The advantage and spirit of the invention may be understood by the following recitations together with the appended drawings.

BRIEF DESCRIPTION OF THE APPENDED DRAWINGS

FIG. 1A is an outside perspective view of a wireless keyboard 1 according to the first preferred embodiment of the invention showing that the wireless keyboard 1 operates with a radiation-based signal receiver 24A set on a top side of a computing apparatus 2.

Figure 1B:
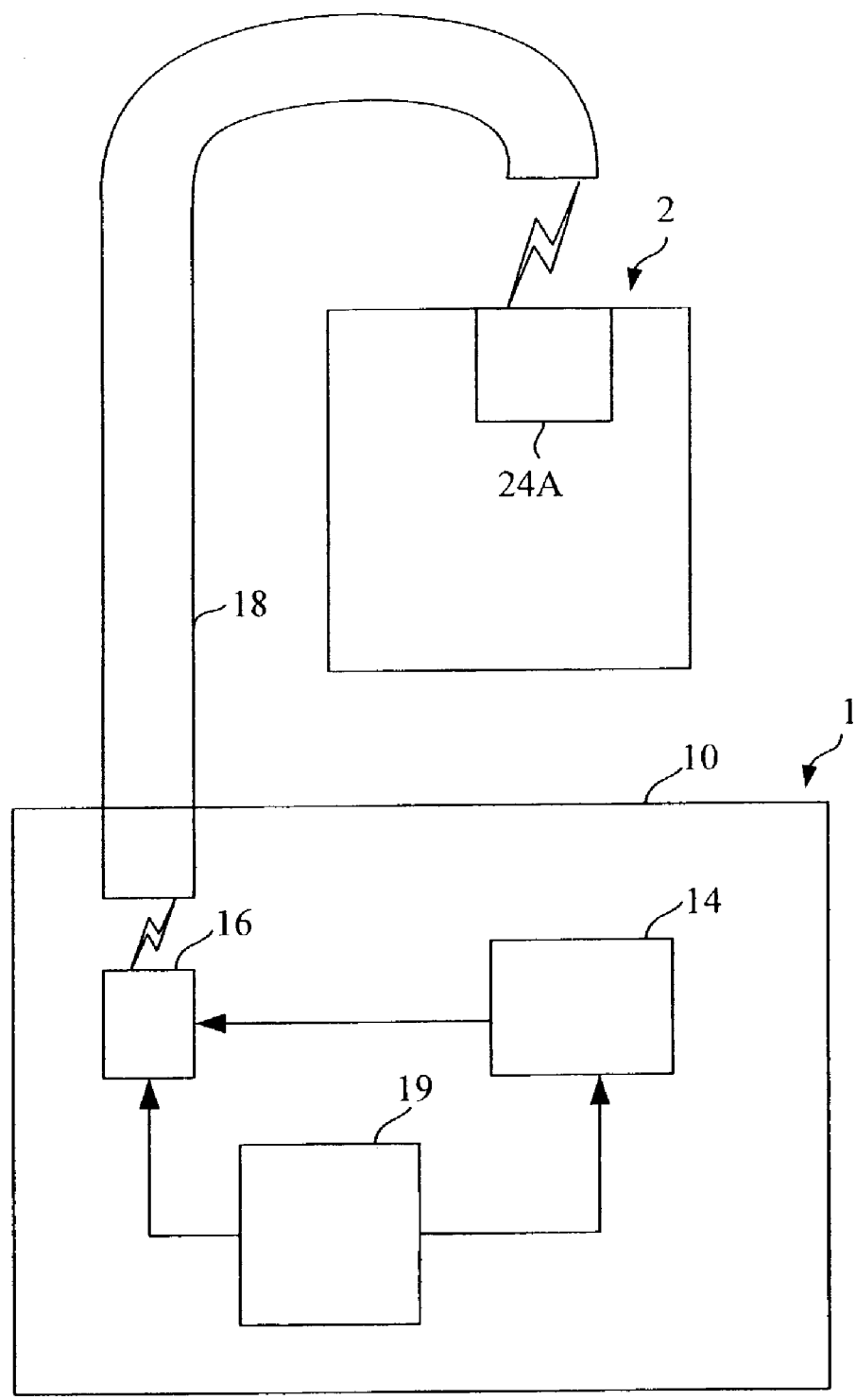

FIG. 1B shows schematically some essential devices of the wireless keyboard 1 in manner of illustrating function blocks.

Figure 1C:
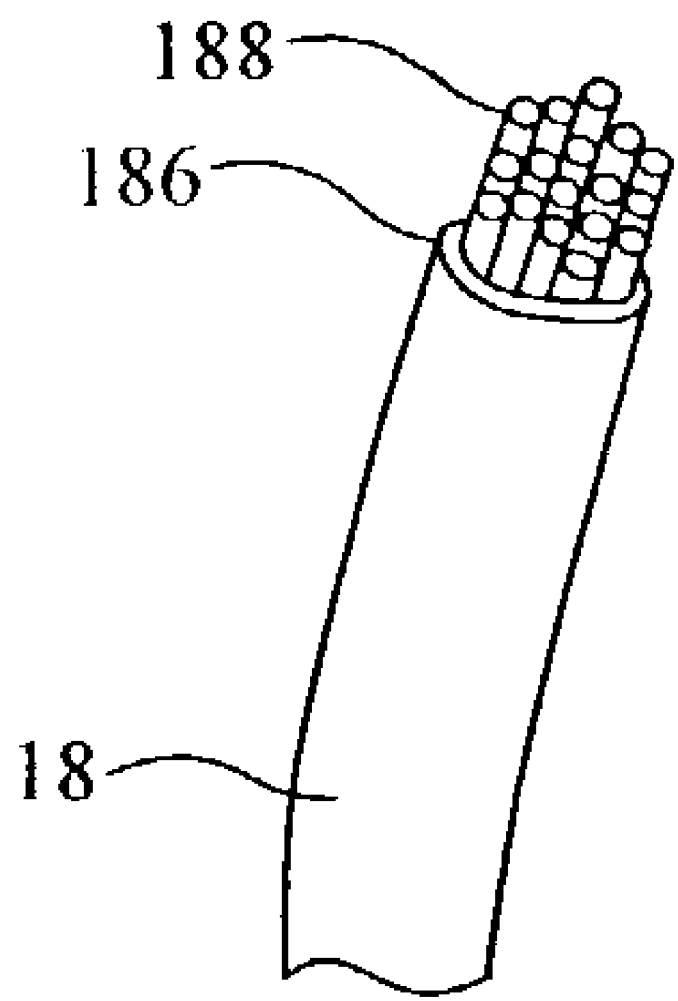

FIG. 1C shows the guiding device 18 consisting of a flexible tube 186 and a bundle of optical fibers 188 wrapped by the flexible tube 186.

Figure 1D:
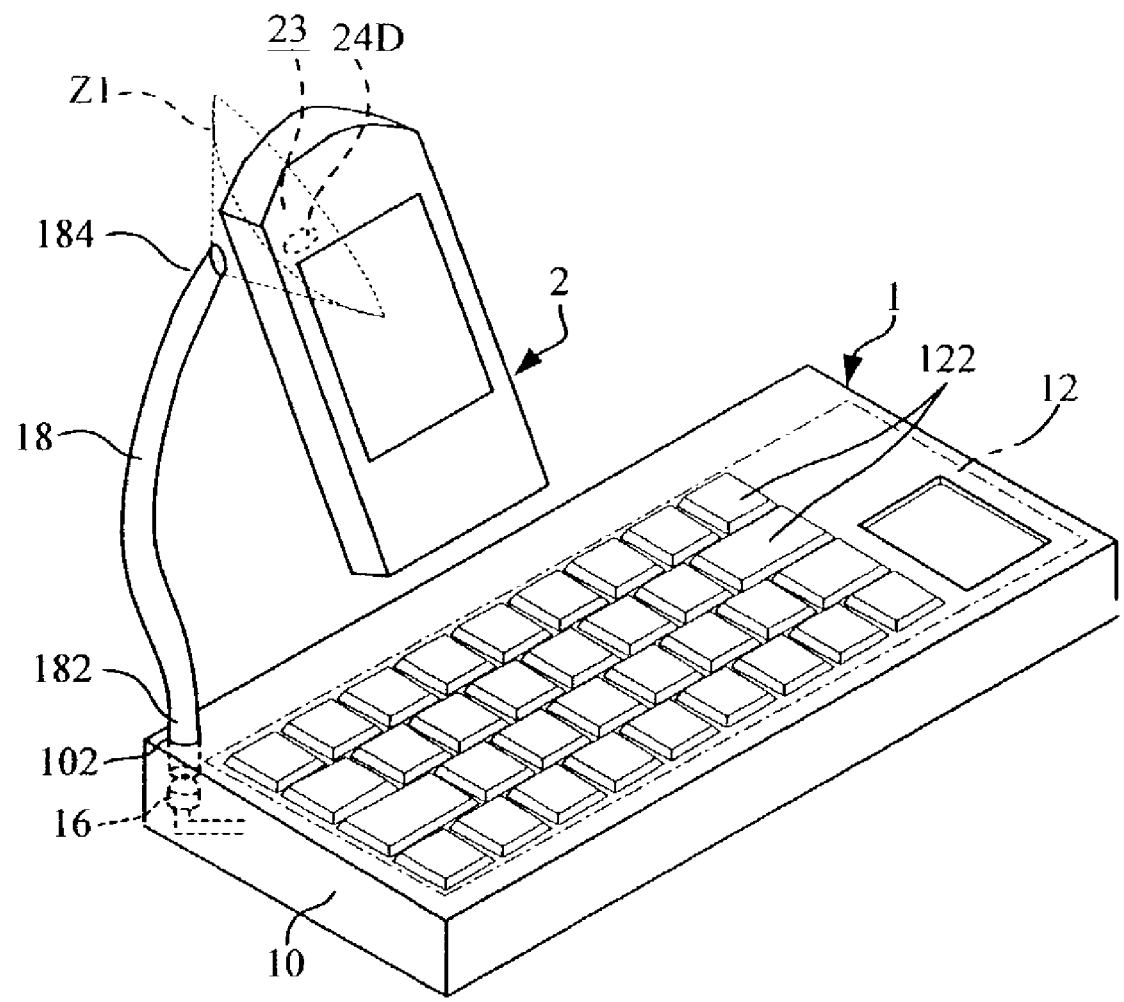

FIG. 1D is another outside perspective view of the wireless keyboard 1 according to the first preferred embodiment of the invention showing that the wireless keyboard 1 operates with a radiation-based signal receiver 24D set on a rear side of the computing apparatus 2.

Figure 2A:
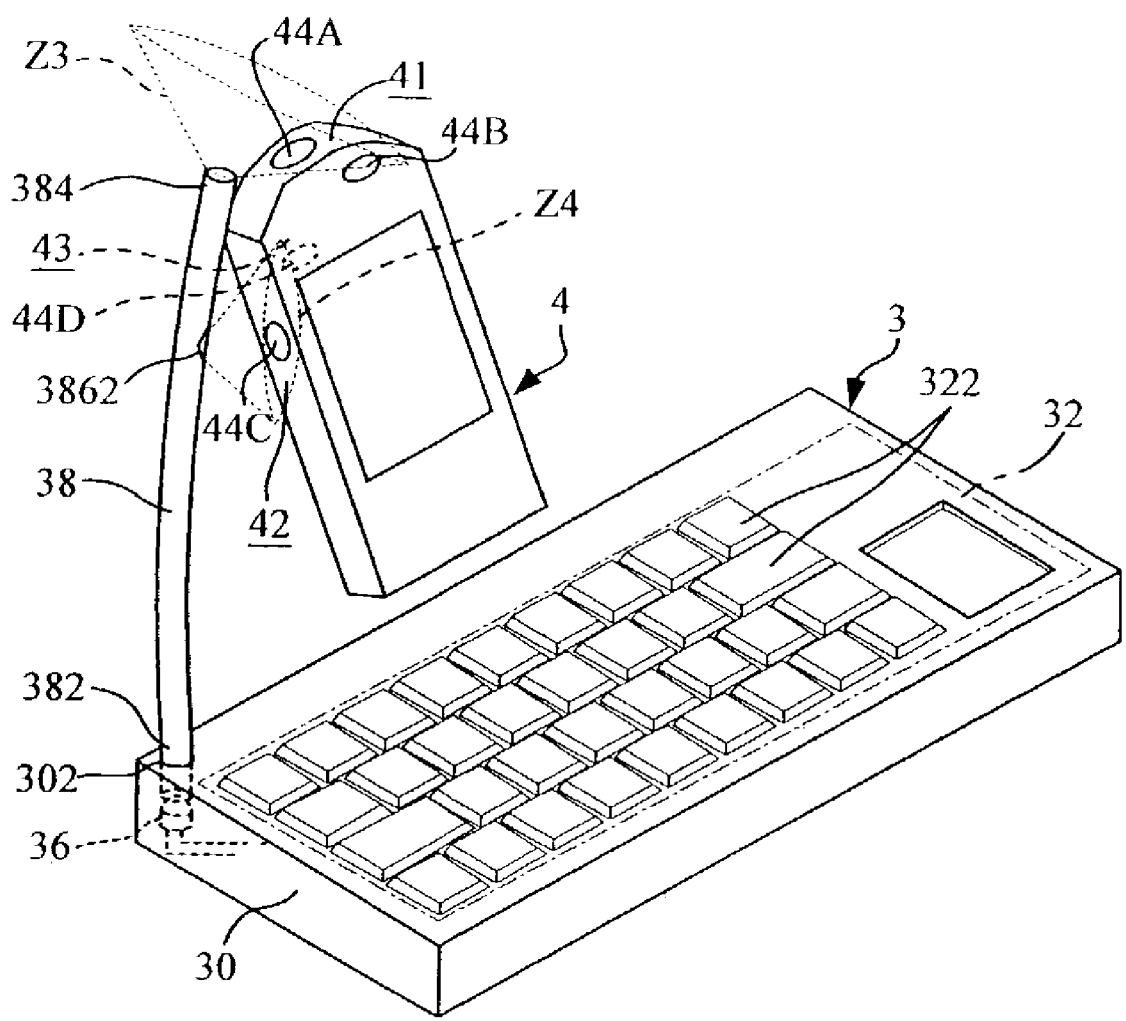

FIG. 2A is an outside perspective view of a wireless keyboard 3 according to the second preferred embodiment of the invention showing that the wireless keyboard 3 operates with a radiation-based signal receiver 44A set on a top side and a radiation-based receiver 44C set on a waist side of a computing apparatus 4.

Figure 2B:
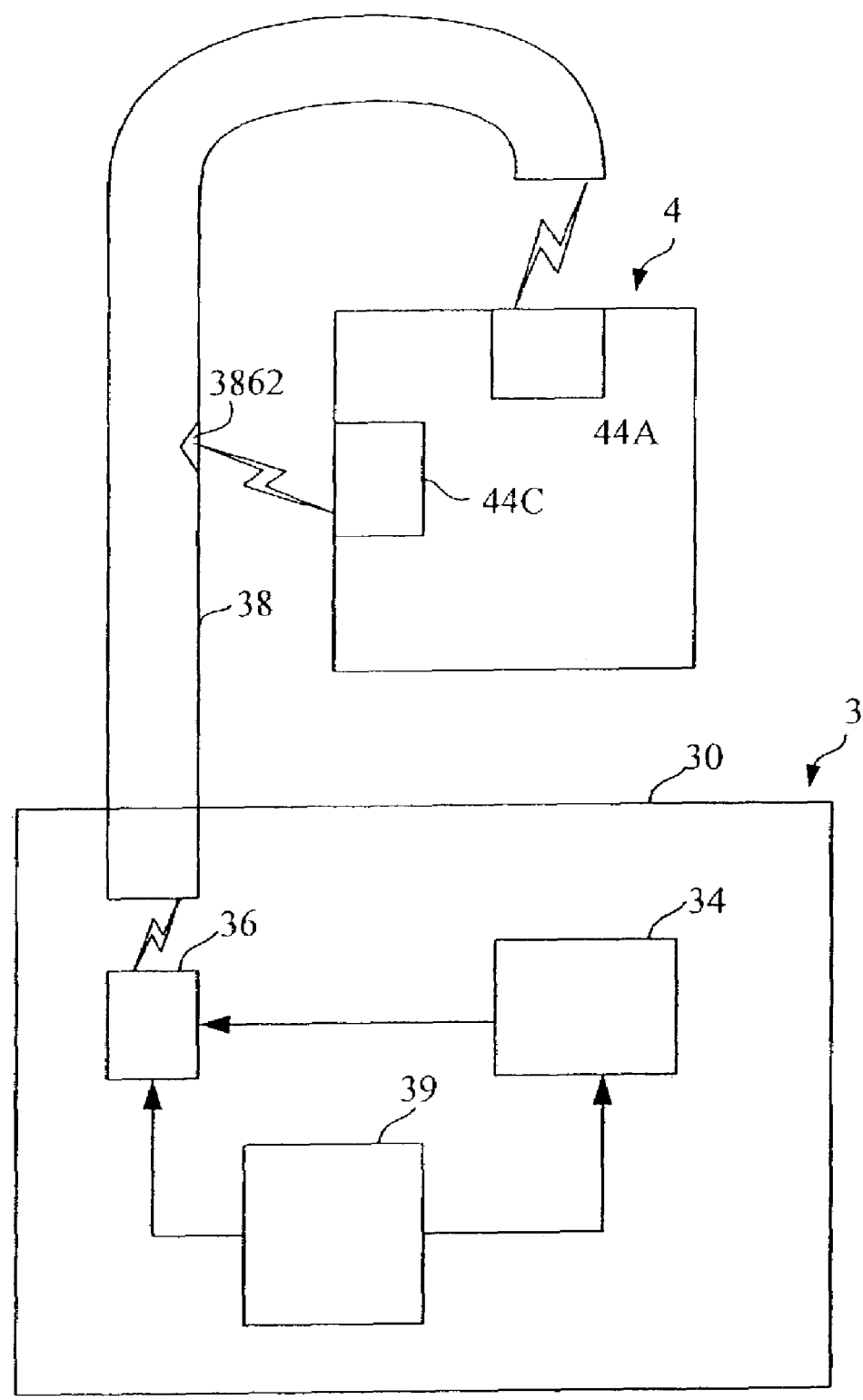

FIG. 2B shows schematically some essential devices of the wireless keyboard 3 in manner of illustrating function blocks.

Figure 2C:
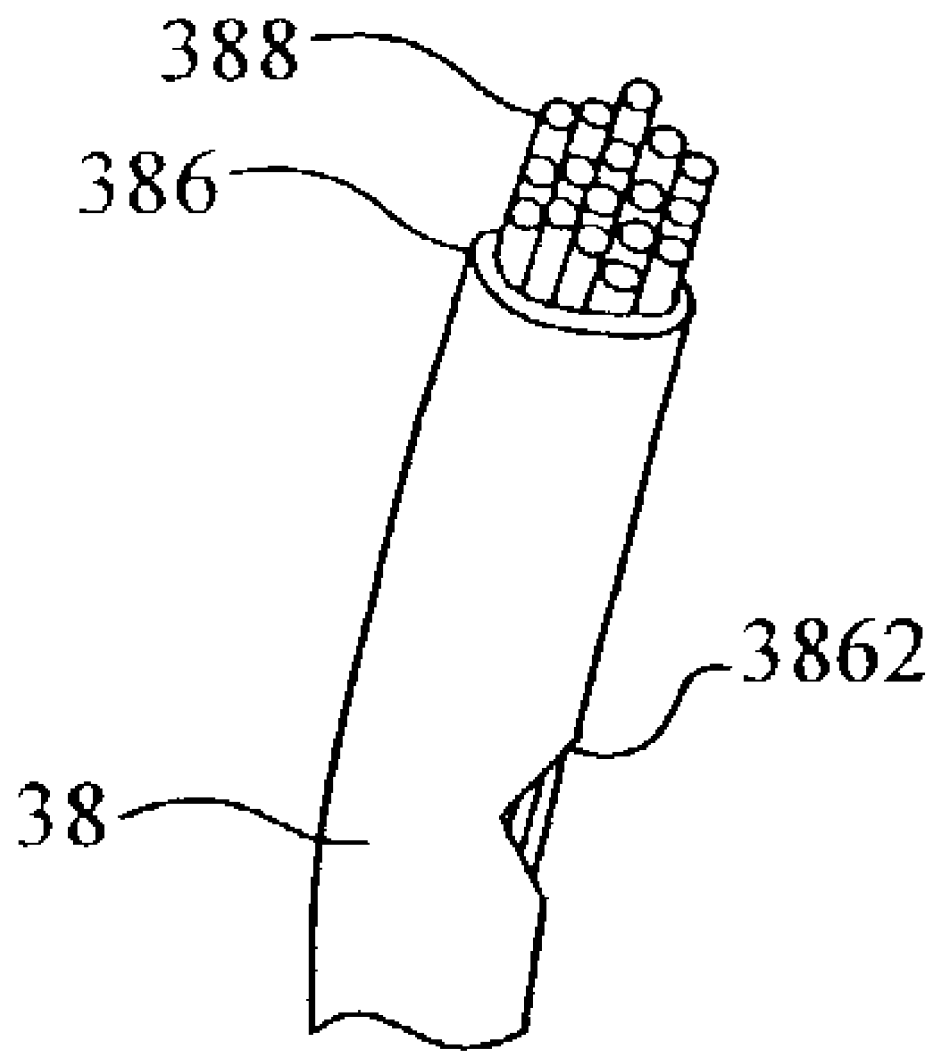

FIG. 2C shows the guiding device 38 consisting of a flexible tube 386 and a bundle of optical fibers 388 wrapped by the flexible tube 386.

DETAILED DESCRIPTION OF THE INVENTION

Referring to FIG. 1A through FIG.1D, the first preferred embodiment of the invention is described in detail. FIG. 1A is an outside perspective view of a wireless keyboard 1 according to the first preferred embodiment of the invention. As shown in FIG. 1A, a computing apparatus 2 such as a personal digital assistant has a top side 21, a waist side 22 and a rear side 23. The computing apparatus 2 has a radiation-based signal receiver with which the wireless keyboard 1 is capable of operating.

In practice, the radiation-based signal receiver may be set on any situation of the computing apparatus 2. For example, the radiation-based signal receiver, marked by numeral notation 24A, is set on the top side 21 of the computing apparatus 2. The radiation-based signal receiver, marked by numeral notation 24B, is set near the top side 21 of the computing apparatus 2. The radiation-based signal receiver, marked by numeral notation 24C, is set on the waist side 22 of the computing apparatus 2. The radiation-based signal receiver, marked by numeral notation 24D, is set on the rear side 23 of the computing apparatus 2. Usually, the computing apparatus 2 has only one radiation-based signal receiver. For the purpose of description, the following description will describe how does the wireless keyboard 1 operate with the radiation-based signal receiver 24A of the computing apparatus 2.

FIG. 1B shows schematically some essential devices of the wireless keyboard 1 in manner of illustrating function blocks. In FIG. 1B, the transmission of signal and radiation beam between the wireless keyboard 1 and the computing apparatus 2 is schematically illustrated.

As shown in FIGS. 1A and 1B, the wireless keyboard 1 includes a housing 10, a user input device 12, a processor 14, a radiation-based signal transmitter 16 and a user-adjustable guiding device 18.

The user input device 12 is mounted in the housing 10. The user input device 12 includes a plurality of user-operable keys 122, as shown in FIG. 1A. The user input device 12 also includes a supporting stand 13 disposed on its housing for supporting the computing apparatus 2 in a predetermined up-right position. When the computing apparatus 2 is disposed on the supporting stand 13, then the top end of the user-adjustable guiding device 18 can emit the radiation beam toward the computing apparatus 2 supported by the supporting stand 13.

The processor 14 can generate a corresponding key signal in responsive to key-in of one of the keys 122.

The radiation-based signal transmitter 16 functions converting the corresponding key signal from the processor 14 into a radiation beam, and emitting the radiation beam then. In this embodiment, the radiation beam can be an infrared beam, the radiation-based signal transmitter 16 can be an infrared transmitter, and the radiation-based signal receiver 24A can be an infrared receiver.

As shown in FIG. 1A, the user-adjustable guiding device 18 has a first end 182 and a second end 184. The first end 182 abuts on the radiation-based signal transmitter 16 such that the radiation beam emitted by the radiation-based signal transmitter 16 enters into the guiding device 18 from the first end 182. The guiding device 18 also leads the radiation beam out form the second end 184. It is noted that the radiation beam led out from the second end 184 of the guiding device 18 has a covered zone Z1. It is well-known that that the radiation-based signal receiver 24A of the computing apparatus 2 must be located in the covered zone Z1 of the radiation beam during the operation of the wireless keyboard 1 with the radiation-based signal receiver 24A of the computing apparatus 2.

When the wireless keyboard 1 operates with the radiation-based signal receiver 24A, the second end 184 of the guiding device 18 approaches the radiation-based signal receiver 24A by adjusting the guiding device 18 such that the radiation-based signal receiver 24A is located in the covered zone Z1 of the radiation beam.

In this embodiment, the guiding device 18 includes a flexible tube 186 and a bundle of optical fibers 188 wrapped by the flexible tube 186, as shown in FIG. 1C.

In this embodiment, the housing 10 has a cavity 102 which the radiation-based signal transmitter 16 is set within, as shown in FIGS. 1A and 1D. In such case, the guiding device 18 is detachably plugged into the cavity 102 via the first end 182.

Due to the user-adjustable guiding device 18, the wireless keyboard 1 of the invention can be universally used with the computing apparatus 2 whose radiation-based signal receiver set on any situation, even an "odd" situation. Taking the radiation-based signal receiver 24A set on the top side 21 of the computing apparatus 2 as an example, if the wireless keyboard 1 and the computing apparatus 2, the second end 184 of the guiding device 18 can be lifted higher than the top side 21 of the computing apparatus 2 by adjusting the guiding device 18. Thereby, the radiation-based signal receiver 24A is located in the covered zone Z1 of the radiation beam when the wireless keyboard 1 operates with the radiation-based signal receiver 24A.

Also taking the radiation-based signal receiver 24D of FIG. 1A as another example, as shown in FIG. 1D, the radiation-based signal receiver 24D is set on the rear side 23 of the computing apparatus 2. The wireless keyboard 1 in FIG. 1D is the same as that in FIG. 1A. The computing apparatus 2 in FIG. 1D is the same as that in FIG. 1A, but its the radiation-based receiver 24D is set on the rear side of the computing apparatus 2. In FIG. 1D, only the radiation-based receiver 24D is shown. As shown in FIG. 1D, the position of the second end 184 of the guiding device 18 can be adjusted by adjusting the engaging device 18. Therefore, when the wireless keyboard 1 operates with the radiation-based signal receiver 24D, the second end 84 of the guiding device 18 can also approach the radiation-based signal receiver 24D, and thereby, the radiation-based signal receiver 24D is located in the covered zone Z1 of the radiation beam.

As shown in FIG. 1B, the wireless keyboard 1 further includes a battery 19, such as a rechargeable battery or a dry battery, for supplying power of the processor 14 and the radiation-based signal transmitter 16.

Referring to FIG. 2A through FIG. 2C, the second preferred embodiment of the invention is described in detail. FIG. 2A is an outside perspective view of a wireless keyboard 3 according to the second preferred embodiment of the invention. Also shown in FIG. 2A, a computing apparatus 4, such as a personal digital assistant, has a top side 41, a waist side 42 and a rear side 43. Differing from the computing apparatus 2 of FIG. 1A, the computing apparatus 4 of FIG. 2A has at least two radiation-based signal transmitters. It is noted that the radiation-based signal transmitters of the computing apparatus 4 may be set on any situation of computing apparatus 4 thereon, even an "odd" situation. For example, the radiation-based signal receiver, marked by numeral notation 44A, is set on the top side 41 of the computing apparatus 4. The radiation-based signal receiver, marked by numeral notation 44B, is set near the top side 41 of the computing apparatus 4. The radiation-based signal receiver, marked by numeral notation 44C, is set on the waist side 42 of the computing apparatus 4. The radiation-based signal receiver, marked by numeral notation 44D, is set on the rear side 43 of the computing apparatus 4. The wireless keyboard 3 is capable of operating with one or all of the radiation-based signal receivers of the computing apparatus 4 at the same time. For the purpose of description, it is assumed that the computing apparatus 4 has two radiation-base signal transmitters 44A, set on the top side 41, and the radiation-based signal transmitter 44C, set on the waist side 42. The following description will describe how the wireless keyboard 3 operates with the radiation-based signal receiver 44A and/or the radiation-based signal transmitter 44C of the computing apparatus 4.

FIG. 2B shows schematically some essential devices of the wireless keyboard 3 in manner of illustrating function blocks. In FIG. 2B, the transmission of signal and radiation beam between the wireless keyboard 3 and the computing apparatus 4 is schematically illustrated.

As shown in FIGS. 2A and 2B, the wireless keyboard 3 includes a housing 30, a user input device 32, a processor 34, a radiation-based signal transmitter 36 and a user-adjustable guiding device 38.

The user input device 32 is mounted in the housing 30. The user input device 32 includes a plurality of user-operable keys 322, as shown in FIG. 2A.

The processor 34 can generate a corresponding key signal in response to key-in of one of the keys 322.

The radiation-based signal transmitter 36 functions converting the corresponding key signal from the processor 34 into a radiation beam, and emitting the radiation beam then. In this embodiment, the radiation beam can be an infrared beam, the radiation-based signal transmitter 36 can be an infrared transmitter, and each of the radiation-based signal receivers 44A and 44C can be an infrared receiver respectively.

As shown in FIG. 2A, the user-adjustable guiding device 38 has a first end 382 and a second end 384. The first end 382 abuts on the radiation-based signal transmitter 36 such that the radiation beam emitted by the radiation-based signal transmitter 36 enters into the guiding device 38 from the first end 382. The guiding device 38 also leads the radiation beam out from the second end 184. It is noted that the radiation beam led out from the second end 384 of the guiding device 38 has a first covered zone Z3. It is well-known that one of two radiation-based signal receivers (44A and 44C) of the computing apparatus 4 must be located in the first covered zone Z3 of the radiation beam during the operation of the wireless keyboard 4 with said one of two radiation-based signal receivers (44A and 44C). Taking the radiation-based signal receiver 44A as an example, the following description will describe how is the radiation-based signal 44A wireless keyboard 4 located in the first covered zone Z3 of the radiation beam.

When the wireless keyboard 3 operates with the radiation-based signal receiver 44A, the second end 384 of the guiding device 38 approaches the radiation-based signal receiver 44A by adjusting the guiding device 38 such that the radiation-based signal receiver 44A is located in the first covered zone Z3 of the radiation beam, as shown in FIG. 2A.

In this embodiment, the guiding device 38 includes a flexible tube 386 and a bundle of optical fibers 388 wrapped by the flexible tube, as shown in FIG. 2C.

In this embodiment, the housing 30 has a cavity 302 which the radiation-based signal transmitter 36 is set within, as shown in FIG. 2A. In such case, the guiding device 38 is detachably plugged into the cavity 302 via the first end 382.

In this embodiment, the flexible tube 386 hereon provides with at least one breach 3862 which the radiation beam is leaked out from, as shown in FIG. 2A. Certain surface treatment has been applied onto a portion of the optical fibers 388 surface (for example, the "surface cut" treatment disclosed in the U.S. Pat. No. 6,289,150), so the portion of optical fibers 388 adjacent to the breach 3862 can emit the IR light from its side surface. The radiation beam leaked out from each of the at least one breach has a respective second covered zone Z4. When the wireless keyboard 3 communicates with the computing apparatus 4, one of the at least one breach 3862 approaches the radiation-based signal receiver 44C by adjusting the guiding device 38 such that the radiation-based signal receiver 44C is located in the second covered zone Z4 of the radiation beam leaked out from said one of the at least one breach 3862.

As shown in FIG. 2B, the wireless keyboard 3 further includes a battery 39, such as a rechargeable battery or a dry battery, for supplying power of the processor 34 and the radiation-based signal transmitter 36.

It will be apparent to those skilled in the art, after reading this detailed description, that the wireless keyboard of the invention can provide clear line-of-sight between the radiation-based signal transmitter of the wireless keyboard and the radiation-based signal receiver of the computing apparatus. Due to the improved radiation transmission between the radiation-based signal transmitter and the radiation-based signal receiver, the radiation-based transmitter of the wireless keyboard can employ devices of less power consumption in this invention.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A first electronic device capable of communicating with a second electronic device via a radiation beam, said first electronic device comprising:
 a housing;
 a radiation-based signal transmitter, disposed on the housing, for emitting the radiation beam; and
 a guiding device having a first end and a second end, the first end disposed on the housing and neighboring to the radiation-based signal transmitter such that the radiation beam emitted by the radiation-based signal transmitter enters into the guiding device from the first end, and substantially transmits along the longitudinal axis of the guiding device and out from the second end; and
 a supporting stand disposed on the housing for supporting the second electronic device in a predetermined position, wherein the guiding device is adjustable so that the radiation beam, led out from the second end of the guiding device, transmits toward the second electronic device supported by the supporting stand.

2. The first electronic device of claim 1, wherein the guiding device comprises a flexible tube and a bundle of optical fibers wrapped by the flexible tube.

* * * * *